United States Patent
Maienschein (10) Patent No.: US 8,047,922 B2
(45) Date of Patent: Nov. 1, 2011

(54) VIBRATION DAMPER, PARTICULARLY A MULTISTAGE TORSION VIBRATION DAMPER

(75) Inventor: Stephan Maienschein, Baden-Baden (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/697,579

(22) Filed: Feb. 1, 2010

(65) Prior Publication Data
US 2010/0133062 A1 Jun. 3, 2010

(30) Foreign Application Priority Data
Aug. 2, 2007 (DE) ............... 10 2007 039 190

(51) Int. Cl.
*F16F 15/121* (2006.01)
(52) U.S. Cl. ........................................ 464/68.8
(58) Field of Classification Search ............ 464/68.7, 464/68.8; 192/213.2–213.22
See application file for complete search history.

(56) References Cited

U.S. PATENT DOCUMENTS

| | | | |
|---|---|---|---|
| 3,138,011 A | 6/1964 | Stromberg | |
| 4,789,375 A * | 12/1988 | Bassett | 464/68.8 |
| 5,816,925 A | 10/1998 | Mizukami | |
| 6,176,362 B1 * | 1/2001 | Arhab | 464/68.8 X |
| 2004/0185940 A1 | 9/2004 | Yamamoto et al. | |
| 2004/0216979 A1 | 11/2004 | Yamashita et al. | |

FOREIGN PATENT DOCUMENTS

| | | |
|---|---|---|
| DE | 3047039 | 9/1981 |
| DE | 19652730 | 6/1997 |
| EP | 1460303 | 9/2004 |

* cited by examiner

*Primary Examiner* — Gregory Binda
(74) *Attorney, Agent, or Firm* — Simpson & Simpson, PLLC (57) ABSTRACT

A vibration damper, for example, a multistage torsion vibration damper, including at least two coaxially disposed damper assemblies, each of them including at least one input component and one output component and being disposed on different diameters, a first damper assembly being disposed on the outside in a radial direction and configured as a series damper, including at least two dampers connected in series and coupled via an intermediate flange, and a second damper assembly being disposed on the inside in the radial direction. The intermediate flange includes at least two annular disk-shaped elements disposed at a distance in the axial direction and extending on both sides of the output component of the first damper arrangement at least into the portion of the outer circumference of the output component of the first damper assembly, each including openings extending in the circumferential direction.

11 Claims, 4 Drawing Sheets

VIBRATION DAMPER, PARTICULARLY A MULTISTAGE TORSION VIBRATION DAMPER

CROSS-REFERENCE TO RELATED APPLICATIONS

This application is filed under 35 U.S.C. §120 and §365(c) as a continuation of International Patent Application PCT/DE2008/001146, filed Jul. 10, 2008, which application claims priority from German Patent Application No. 10 2007 036 190.6, filed on Aug. 2, 2007, which applications are incorporated herein by reference in their entireties.

FIELD OF THE INVENTION

The invention relates to a vibration damper, particularly a multistage torsion vibration damper, including at least two coaxially disposed damper assemblies, each of them including at least one input component and one output component and being disposed on different diameters, a first damper assembly being disposed on the outside in a radial direction and configured as a series damper, including at least two dampers connected in series and coupled via an intermediate flange, and a second damper assembly being disposed on the inside in the radial direction.

BACKGROUND OF THE INVENTION

Vibration dampers, in particular provided as multistage torsion vibration dampers are known in the art in many embodiments. When disposed in a drive train, they function, viewed in the direction of the force flow, as an elastic clutch between an input and an output and are coupled to the connection elements forming the input and the output. The device transfers torque and simultaneously compensates vibrations occurring during power transmission. Also an embodiment as an absorber are conceivable. In this case the device does not transfer any torque between the adjacent connection elements, but only torque spikes are reduced through the particular components. Such devices for damping vibrations are based on different functional principles depending on the type of damping. Besides purely mechanical damping solutions also hydraulic damper solutions and combined mechanical-hydraulic damper solutions are known. Mechanical dampers include a rotating component which can have one or several components and which functions as an input component or output component of the vibration damper depending on the direction of the force flow, in particular a primary component and a secondary component which are disposed coaxial to one another and which are rotatable within limits in circumferential direction relative to one another. The coupling between the input component and the output component is performed through torque transfer devices and vibration damping devices which are typically formed by spring units and which include at least one spring element provided as a compression spring. Vibrations can be compensated and reduced through the size of the rotation angle between the input component and the output component and the spring force.

From the printed document DE 30 47 039 A1 an embodiment of a two stage device for damping vibrations and for transmitting torque between a drive and an output is known which includes two damper assemblies connected in series. In order to facilitate a larger relative movement between the driving and driven elements of the vibration damper, the device is provided with two stages. Thus the device includes two concentric circles of damping springs which are configured in a housing and which are driven by drive lugs which are mounted in a drive element, e.g. a piston plate for a lock up clutch. Thus floating elements separate the springs in the inner and outer spring circles into two or more groups of springs. Thus, the two or more groups of springs function in parallel to one another in each circle, while the springs in each group function in series. Thus the power transfer in the force flow is performed in series. The damper disposed on the inside does not have any torsion clearance, this means it is operated continuously.

From the printed document U.S. Patent Application No. 2004/0216979 A1 an embodiment of a vibration damper is known including at least two damper assemblies which are connected in parallel. Both damper assemblies are effective continuously. The damper assembly for the smaller rotation angles is disposed on a radially inner diameter, while the greater rotation clearance is implemented through the second damper assembly on a radially outer diameter. The radially inner damper assembly is configured as a series damper, including spring elements separated by a single component flange and connected in series.

From the printed document U.S. Patent Application No. 2004/0185950 a vibration damper is known which is configured as a series—parallel damper including a first rotating element and a second rotating element which are rotatable relative to one another within limits. Furthermore, the device includes a pair of first elastic elements oriented in one rotation direction and connected in series, which are coupled through a floating intermediary flange and another second elastic element, which is connected in parallel to the first elastic elements. The second elastic element is configured, so that it is compressed in the rotation direction after the pair of first elastic elements is compressed to a first angle due to a relative rotation of the first rotating element and the second rotating element. For this purpose a free angle is associated with the second elastic element, which free angle in integrated in the rotating flange. The disposition of first and second elastic elements is provided overlapping for reducing the radial installation space to one diameter or in radial direction with respect to the annular portions theoretically created through the extension of the spring elements. The coupling between the first elastic elements is performed through a floating flange.

The separation of the spring element in series damper assemblies which form the radially outer damper stage is generally performed through a floating flange. The floating flange is provided as an annular element with protrusions configured at the inner circumference, which inner circumference forms a contact surface in the center portion for the spring units. The intermediary flange is often tension- and deformation critical under load.

An embodiment of a series damper device is known from the printed document U.S. Pat. No. 3,138,011. The damper described herein includes two damper stages disposed on different diameters. The first damper stage is configured as a series damper with torque transfer devices and damper coupling devices disposed on one diameter. The device furthermore includes two side plates and an annular flange configured as an output flange disposed there between and discs configured with recesses with spring elements and disposed floating between annular flange and side plates, which discs separate the spring units of the particular dampers of the series damper.

All recited embodiments have in common that a spring characteristic is achieved in order to achieve a desired function.

BRIEF SUMMARY OF THE INVENTION

The object of the invention is to provide a vibration damper with dampers of a series damper assembly which are separated through an intermediary flange, in which series damper assembly the intermediary flange shall be characterized by a low stress configuration. The solution according to the invention shall be characterized by low design and manufacturing complexity and shall furthermore be suitable for integration into force transmission devices for use in drive trains. The vibration damper device shall require the lowest possible installation space in radial and in axial direction.

A vibration damper, particularly a multistage torsion vibration damper, including at least two coaxially disposed damper assemblies, each of them including at least one input component and one output component and being disposed on different diameters, a first damper assembly being disposed on the outside in a radial direction and configured as a series damper, including at least two dampers connected in series and coupled via an intermediate flange, and a second damper assembly being disposed on the inside in the radial direction. The solution according to the invention is characterized in that the intermediate flange includes at least two annular disk-shaped elements disposed at a distance in the axial direction and extending on both sides of the output component of the first damper arrangement at least into the portion of the outer circumference of the output component of the first damper assembly, each including openings extending in the circumferential direction.

The embodiment of the intermediary flange with at least two components according to the invention which are configured as annular disc shaped elements with a closed rim configured in the portion of the inner circumference has the advantage over the single component open embodiment that it includes low tensions under load and a low materials thickness, which reduces the moment of inertia. This reduction helps to move the resonance of the intermediary flange into less speed critical ranges. Remaining vibrations on lower energy level can be damped according to an embodiment through an additional friction device. This friction can be generated through elastic elements which are disposed between the annular disc shaped elements and which press the annular disc shaped elements in axial direction against the side discs.

According to a particularly preferred embodiment the vibration damper device is configured as a series-parallel damper including two damper stages connected in parallel which are disposed on different diameters. The second damper stage is configured with torsional clearance. The disposition of the first damper assembly is provided according to the invention on a diameter in radial direction which is greater than the diameter of the second damper assembly. The output component of the first damper assembly and the output component of the second damper assembly form a unit. This solution facilitates on the one hand a very compact combined assembly in which the vibration damper is characterized by a spring constant which is as low as possible in a rotation angle range which is as large as possible with low friction. Production is relatively simple and inexpensive due to the functional concentration in the particular components.

The second damper assembly is thus configured at the lowest possible distance from the rotation axis. Both damper assemblies are configured coaxial relative to one another and can be configured with an offset in axial direction but preferably in one plane. In the latter case, the damper assembly in the form of a multistage damper in which the damper characteristic can be variably adjusted based on the separate configuration of the particular damper assembly, is relatively small in axial direction and also in radial direction.

Due to the configuration of the first damper assembly on the outside in radial direction it can implement these large relative rotation angles. The first damper assembly operates in this relative rotation angle range and thus a damping can also be implemented for higher moments. In a particularly advantageous embodiment the first damper assembly includes at least two dampers connected in series, a first and a second damper. Each respective output component of a damper forms the input component of the other damper, or is coupled torque proof with this damper. According to a particularly advantageous embodiments the series damper is thus implemented on a common diameter, this means two single dampers are disposed on a common diameter and do not have any offset in radial direction. In this case the radial dimensions for the entire damper can be kept small. Each of the particular damper assemblies includes a primary component functioning as an input component viewed in force flow direction and a secondary component functioning as output component. The function can be changed according to the force flow direction and according to a change of the force flow direction, this means the function changes. Thus the input and output components can be configured in one piece or in several pieces. Preferably respective single piece disc shaped embodiments are selected. They are coupled with one another through devices for torque transmission and devices for damping coupling. The devices for torque transmission and damping coupling are formed by elastic elements, in particular spring units. Thus, the particular spring units are configured as single springs or can also be provided as spring units connected in series. The particular damper assembly thus functions as an elastic coupling which transfers torque and compensates vibrations simultaneously. The first damper assembly includes an input component and an output component. The same applies for the second damper assembly; however, the input component of the first and second damper assembly are coupled to one another or connected in parallel, so that a moment partition can be performed herein through the two damper assemblies.

In order to implement the parallel connection, the input and output components of the particular damper assembly form a unit, this means they can e.g. be coupled to one another torque proof. In this case the particular input and output components are configured as separate elements which are functionally coupled with one another only through the connection. According to a particularly advantageous embodiment, however an integral configuration is desired, this means the input component and the output component of the second damper assembly are respective configured in one piece, this means the elements of the first damper assembly forming the input component or the output component are simultaneously configured as input component or the output component of the second damper assembly.

Each of the particular dampers of a series damper assembly of the first damper stage thus includes preferably identically sized torque transfer devices and/or damping coupling devices. Thus it is possible also here to implement independence from the relative rotation angle though a respective integration in the entire system and to run torque in each case through the output of the first damper assembly in combination with the moment conducted through the second damper assembly to an element in a drive train which element is to be driven.

According to another embodiment, it is also feasible to dispose the particular dampers of the first damper assembly on different diameters. In this case theoretically also the transmission elements can be configured differently.

The particular dampers of the first damper assembly configured as a series damper are coupled with one another though a two- or multi component intermediary flange configuration which can be configured as a drive disc or a floating flange.

The relative rotation clearance of the second damper assembly is characterized by a predetermined relative rotation angle between the input component and the output component of the second damper assembly, which predetermined relative rotation angle defines a free angle in which the second damper assembly is not effective. The relative rotation angle is integrated in the output component.

The device is configured as a mechanical friction damper in the simplest case. The device includes tow side discs configured in axial direction and coupled torque proof with one another, which side discs can function as drive discs or as an output component. The side discs thus include openings configured in circumferential direction for receiving and configuring stop surfaces configured opposite to one another for the spring elements of the particular damper assemblies and for the dampers of the first damper assembly. Thus, the recesses forming stop surfaces in circumferential direction or the pass through openings are disposed relative to one another, so that a free angle can be implemented for the second damper assembly, thus a relative rotation range between input- and output component, which does not have any effect upon the second damper device, this means the second damper only becomes effective when a certain predefined relative rotation angle is achieve between input component and output component.

This statement also applies analogously for the flange disposed between the two side discs, in particular the disc shaped element provided in the form of the flange which simultaneously forms the output component of the first and second damper assembly.

Depending on the coupling or the connection in a force transmission device, the various elements can respectively function as an input component. This depends on which elements are coupled to the drive assembly and which are coupled to the output side viewed in force flow direction. According to a first embodiment, the drive can be implemented through side discs. In this case they are coupled at least indirectly torque proof to a driving element, e.g. a force transmission device, a lockup clutch or a drive engine. The power transmission is then performed in the first damper assembly to the intermediary flange on to the flange which forms the output component of the device and the output component of the second device.

According to a second embodiment, it is also conceivable to introduce the power through the drive flange. In this case the power transmission is performed onto the side discs of the first and the second damper assembly which function as output components.

The solution according to the invention is not limited to the described embodiment and design details are at the discretion of a person skilled in art.

BRIEF DESCRIPTION OF THE SEVERAL VIEWS OF THE DRAWING

The solution according to the invention is subsequently described with reference to drawing figures, wherein.

DETAILED DESCRIPTION OF THE INVENTION

Figure 1A:
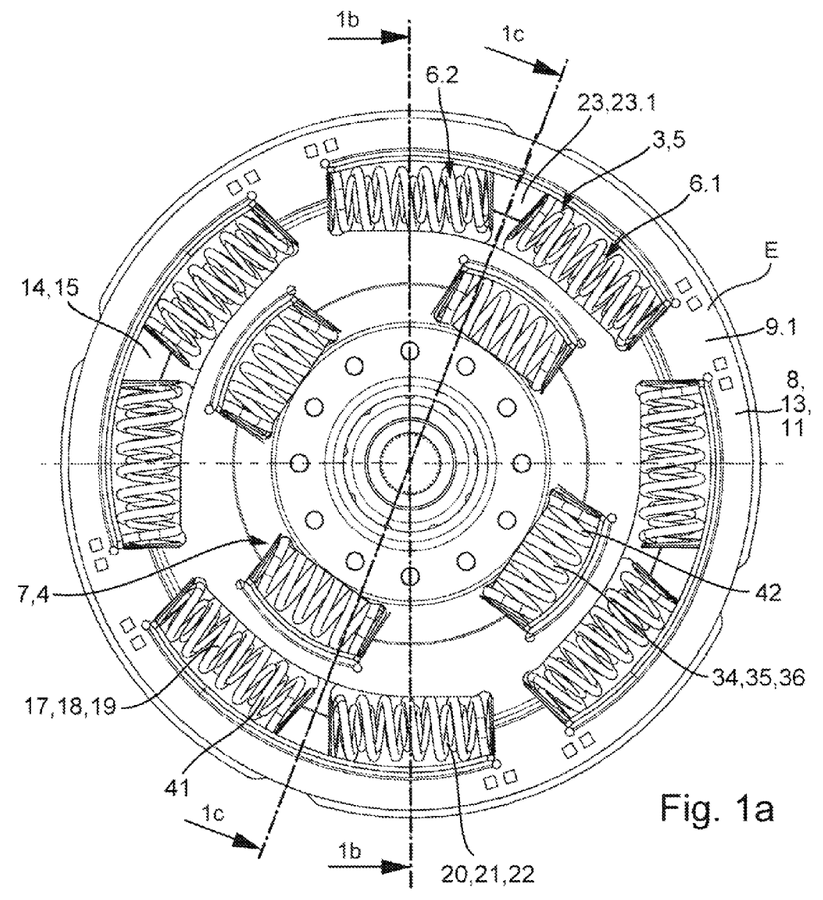
FIG. 1a illustrates the basic configuration and the basic principle of a vibration damper configured as a series-parallel damper in a view from the right in a simplified schematic depiction.
Figure 1B:
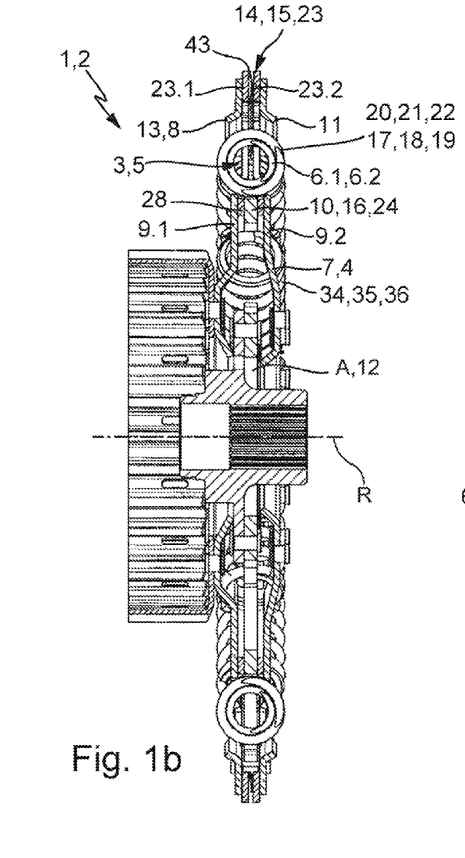
FIGS. 1b & 1c illustrate two axial sectional views generally along lines 1b-1b and 1c-1c, respectively, in FIG. 1a in a simplified schematic depiction of a vibration damper according to the invention.
Figure 1C:
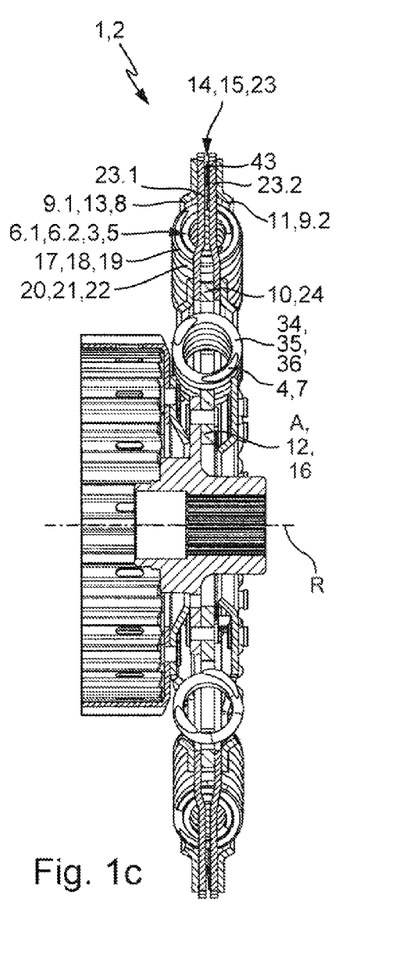
Figure 1D:
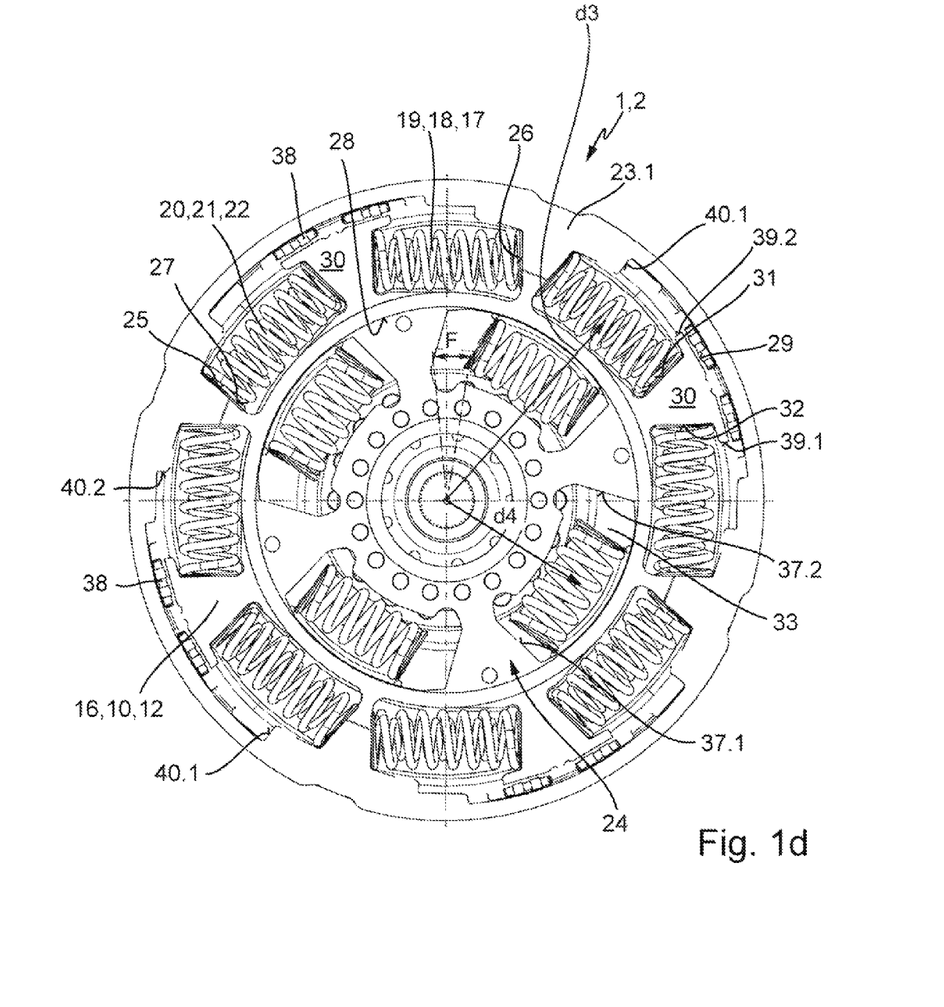
FIG. 1d illustrates a view according to FIG. 1a without axial side discs.

FIGS. 1a to 1d illustrate the basic configuration and the basic principle of a vibration damper 1 in particular provided as a torsion vibration damper in several views in a simplified schematic depiction. FIG. 1a illustrates the basic configuration and the basic principle of a vibration damper in the form of a series-parallel damper in a view from the right in a simplified schematic depiction. FIGS. 1b and 1c illustrate two axial sectional views generally along lines 1b-1b and 1c-1c, respectively, in FIG. 1a in a simplified schematic depiction. FIG. 1d illustrates a view according to FIG. 1a without axial side discs. The subsequent descriptions thus relate to all figures. The vibration damper 1 according to the invention is configured as a multistage series-parallel damper 2. The vibration damper 1 functionally includes two damper stages 3, 4 which are respectively formed by a damper assembly, a first damper assembly 5 and a second damper assembly 7 and which are connected in parallel. Connected in parallel, thus means that both damper assemblies 5 and 7 are disposed in the force flow in parallel. The force flow occurs in parallel or in both damper assemblies 5 and 7. The first damper assembly 5 is thus disposed on the outside in radial direction and configured as a series damper and this means it includes at least two dampers 6.1 and 6.2 connected in series. Connected in series means the power transmission in the force flow is performed in series, in particular both dampers 6.1 and 6.2 in the damper stage 3 are transitioned in sequence. The direction is determined as function of the force input direction. Both are configured on a diameter $d_3$ which is greater than the diameter $d_4$ of the second radially inner damper stage 4. Both dampers 6.1 and 6.2 are coupled to one another through an intermediary flange 23. The intermediary flange 23 according to the invention is not configured in one piece but in several pieces. It includes two floating annular disc shaped elements 23.1 and 23.2 which are configured next to one another in axial direction. They extend in radial direction with their inner diameters into a portion which extends into the portion of the outer circumference of the first damper assembly 5.

Each of the damper stages 3 and 4 is thus effective in different operating ranges. In particular the damper assembly 7 of the second damper stage 4 is configured, so that it only becomes effective after a predefined rotation angle F which is also designated as a free angle. Both damper assemblies 5 and 7 are configured in parallel and combined into a two stage series-parallel damper. Each of the particular damper assemblies 5 and 7 includes rotating components configured integrally or in several parts and operating as input components and output components viewed in force flow direction, which rotating elements are coupled with one another through torque transmission devices and/or damping coupling devices. Preferably the torque transmission devices and the damper coupling devices are formed by the same units, preferably spring units when mechanical damping concepts are used. Thus, the input components and the output components of the particular damper assemblies 5, 7 and of the particular dampers 6.1, 6.2 of the damper assembly 5 are disposed respectively coaxially to one another and rotatable relative to another in circumferential direction within limits. The term input- and output component in force flow direction thus relates to a force flow when disposed in a drive train from a driving component to a driven component. The function as an input component and as an output component can thus be associated with different components in different operating states, this means when used in vehicles in drive trains in traction operation, elements which can be coupled with a drive engine function as input components, while a function reversal is performed in coasting operation since the element functioning as a output component in traction operation now functions as an input component.

Figure 2:
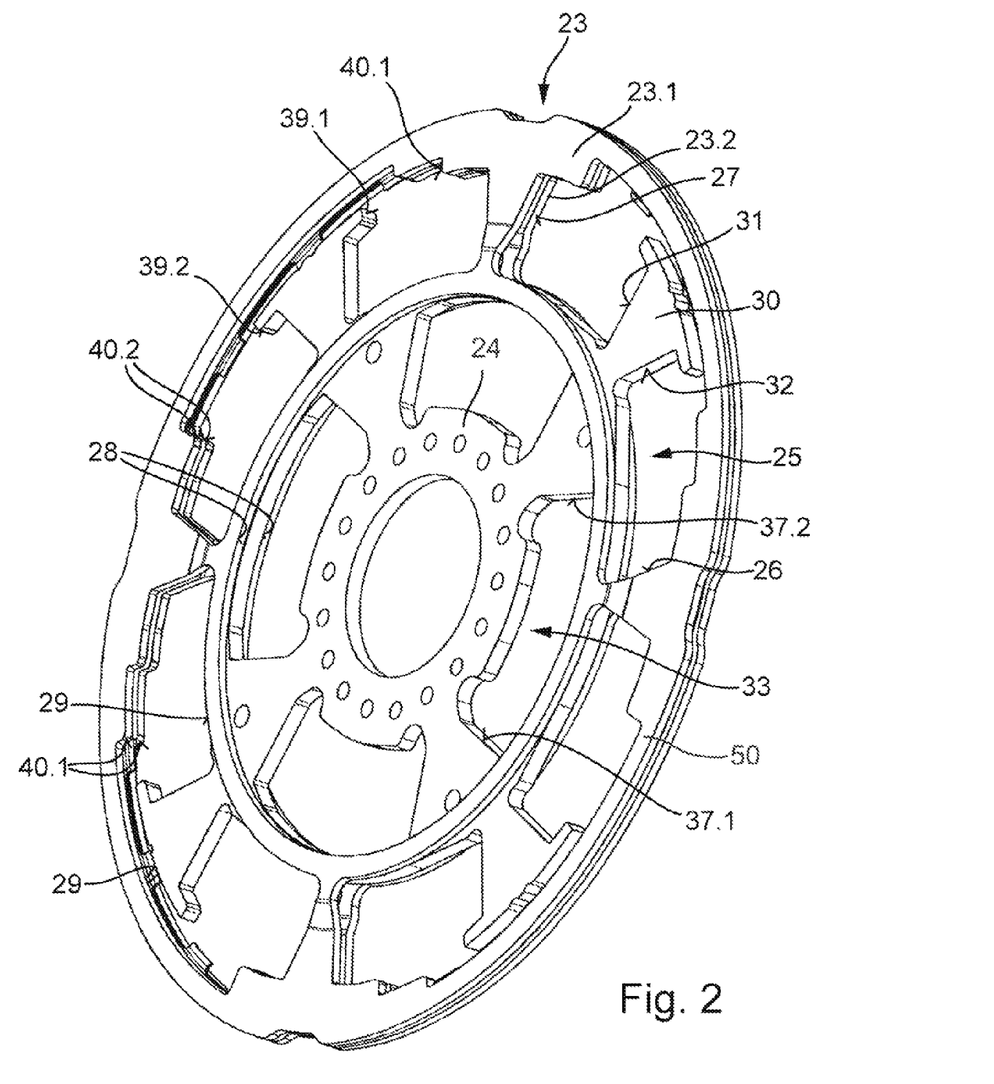
FIG. 2 illustrates an intermediary flange and a drive flange in a perspective view.

The device 1 viewed in force flow direction includes an input component E and an output component A. The input component E is thus formed by an element of the damper assembly 5 and of the damper assembly 7 as an integral unit, or the input components of the damper assemblies 5 and 7 are connected to one another torque proof. The damper assembly 5 includes an input component 8 and an output component 10. The damper assembly 7 includes an input component 11 and an output component 12. Thus, the input components 8 and 11 are preferably formed directly by the input component E and the output components 10, 12 are formed by the output component A. In the first damper assembly 5, two dampers are connected in series, the damper 6.1 and the damper 6.2. Thus, the input 8 of the first damper assembly, which input is connected torque proof to the input E of the entire unit, or preferably formed by it directly, is formed by the input component 13 of the first damper 6.1. The first damper 6.1 furthermore includes an output component 14 which simultaneously forms the input component 15 of the second damper 6.2 of the two dampers of the damper assembly 5, which are connected in series, here it forms the intermediary flange 23, in particular the two annular disk shaped elements 23.1, 23.2. The second damper 6.2 furthermore includes an output component which forms the output component 10 of the damper assembly 5 and which is connected torque proof to the output A or forms the output A. The first damper 6.1 includes torque transmission devices 17 between the input component 13 and the output component 14, and damping coupling devices 18. The second damper 6.2 analogously includes torque transmission devices 20 and damping coupling devices 21. These devices 17, 18, 19, 20 provided as spring units 19, 22 are supported in openings 25 of the annular disk shaped elements 23.1, 23.2, which extend in circumferential direction. With respect to other known series damper solutions, the intermediary flange 23 disposed on the outside is not open on the inside anymore, this means the openings receiving the spring units 19, 20, which openings are defined on both sides by stop surfaces, which are oriented in circumferential direction, do not have an open rim, but the particular elements of the intermediary flange 23 are provided with a closed circumferential rim in the portion of its inner circumference 28, which provides a much higher strength of the flange unit 23 formed from the two annular disk shaped elements 23.1, 23.2. The inner circumference 28 of the annular disk shaped elements 23.1, 23.2 can be described by a diameter, which is smaller than the outer diameter of the output component 10 of the first damper assembly. This means, the annular disk shaped elements 23.1, 23.2 contact the output component 10 on both sides and enclose it in the portion of its outer circumference. Resilient element (43) is disposed between annular disc shaped elements (23.1, 23.2) of the intermediary flange (23) and presses annular disc shaped elements (23.1, 23.2) apart. As shown in FIG. 2 for example, openings (25) are wholly enclosed by each annular disk-shaped element (23.1, 23.2) and are at least partially defined by radially outward portions (50) of annular disk-shaped elements (23.1, 23.2).

The second damper assembly 7 includes at least one damper, in which the input component 11 and the output component 12 are coupled to one another through devices 34 for torque transmission, and devices 35 for damping coupling. The force flow occurs between the input component E and the output component A of the device depending on the direction of rotation in the first damper assembly 5 through the damper 6.1 and the damper 6.2 or vice versa, and simultaneously after reaching the predefined relative rotation angle between input component E and output component A through the damper assembly 7.

In the views according to FIGS. 1*a* and 1*d*, in particular, the configuration of the flanges 23, 24 is shown in the neutral position, this means free from torque.

The configuration of the first damper stage 3 is performed in radial direction with reference to the rotation axis R of the device 1 on a larger diameter $d_3$ than the second additional damper stage 4 on $d_4$. Thus, the disposition of the first damper assembly 5 is performed on the radial outside, while the disposition of the second damper assembly 7 within the extension of the inner diameter of the first damper assembly 5 is thus performed on a smaller diameter $d_4$. The input component E of the device 1 and thus the input components 8, 10 of the damper assemblies 5, 7 are formed by two drive disks 9.1, 9.2 disposed at an offset and coaxial relative to one another, which are coupled with one another torque proof. The output component 10 is configured between the drive disks 9.1 and 9.2, which output component is connected torque proof with the output component of the damper assembly 7 or forms an integral component therewith, thus the flange 24 and simultaneously the output A. The first damper assembly 5 is includes two dampers 6.1 and 6.2. The input component 13 of the first damper 6.1 is thus formed by the drive disks 9.1 and 9.2. This applies analogously also to the input component 11 of the second damper assembly 7. The input component 11 is also formed here by the drive disks 9.1 and 9.2. The first damper 6.1 includes devices 17 for torque transmission between the input component 13 and the output component 14 and devices 18 for damper coupling. The devices 17 and the devices 18 are formed by a unit, in particular a spring unit 19, including at least one spring element in the form of a compression spring. Analogously, also the second damper 6.2 includes devices 20 for torque transmission and devices 21 for damping coupling. These are formed by an additional spring unit 22. As state supra, the input component 13 is formed by the drive disks 9.1 and 9.2, the output component 14 is formed by a so-called floating intermediary flange 22, made of the two ring disk shaped elements 23.1, 23.2, which are not coupled to one another, and which are not supported or connected torque proof at a connection element. The intermediary flange 23 forms the input component 15 of the second damper 6.2. The output component 16 of the second damper 6.2 and thus the output component 10 or A of the device 1 is formed by a flange 24. The devices 17 and 18 or the particular spring units 19 of the first damper 6.1 are supported at the drive disks 9.1 and 9.2, the flange 24 or the intermediary flange 23, while the spring units 22 of the second damper 6.2 can also be supported at the drive disks 9.1, 9.2 or at the intermediary flange 23 and the flange 24 in circumferential direction.

The intermediary flange 23 or the annular disk shaped elements 23.1, 23.2 forming the intermediary flange are configured as a floating flange, this means it does not have a support of its own and is only supported by the spring units 19, 22, and the configuration of the flange 24 or the side disks 9.1 and 9.2 between the spring units 19, 22. The openings 25 in the intermediary flange 23 or the particular ring disk shaped elements 23.1, 23.2 form stop surfaces 26, 27 oriented in circumferential direction facing one another for the spring units 19 or 22 of the dampers 6.1 and 6.2.

The flange 24 visible in a side view in FIG. 1*d* thus forms the output component 10, 12 of the first and also of the second damper assembly 5, 7 and thus also the output component A of the entire vibration damper 1. The vibration damper is thus configured as a disk shaped element. The flange 24 which forms the output component 10 or 12 of the damper assemblies 5, 7 is configured as a radially inner flange and is oriented in radial direction outward at its outer circumference 29, this means it includes protrusions 30 extending from the rotation axis R disposed in circumferential direction at constant distances from one another. Two adjacent protrusions 30 define recesses which are open towards the rim and which extend in circumferential direction, in which recesses, the two spring units 19, 22 of the particular dampers 6.1 and 6.2 are disposed and are supported at the flange 24 at the side surfaces 31 and 32 of such a recess, which face each other. The flange 24 furthermore includes recesses 33 on its diameter $d_4$, which are provided in the form of circumferentially extending openings, which form support surfaces 37.1, 37.2 for the spring units 36 of the torque transfer devices 34 or of the damping coupling devices 35. The support surfaces 37.1, 37.2 are disposed opposite to one another in circumferential direction. These support surfaces 37.1, 37.2, however, only become effective after a particular relative rotation angle F. The spring units 36 are supported at the side disks 9.1 and 9.2 and at the flange 24. As shown in FIG. 2 for example, protrusions (30) are wholly axially aligned with respective openings (25) and are radially inward of respective radially outward portions (50) of annular disk-shaped elements (23.1, 23.2).

FIG. 1*a* illustrates a side view of the side disks in a simplified schematic, which side disks are provided in the form of drive disks 9.1 and 9.2 of the device 1. A disk shaped configuration in the form of an annular disk with openings 41 configured in circumferential direction for receiving spring units 19 and 22 of the dampers 6.1 and 6.2 and supports in circumferential direction and in radial direction are also visible here. In analogy thereto, the drive disks include openings 42 for the second damper assembly 7, which are disposed on a smaller diameter and which receive the spring units 36.

In this embodiment, a moment is inducted in force flow direction when used in drive trains and vehicles in normal traction operation. The torque is transferred from the drive engine to a subsequent power transmission unit, through the drive disks 9.1 and 9.2, which are coupled with one another torque proof. According to FIG. 1*d*, the spring units 19 or 22 are loaded according to the rotation direction, which in turn impact the intermediary flange 23, in particular the protrusion 25, through the stop surfaces 26 or 27, and based on the coupling caused thereby, cause torque transfer with simultaneous damping coupling over the intermediary flange 23 to the additional spring unit, herein e.g. the spring unit 22 and there from onto the flange 24, which forms the output component A. When a relative rotation is performed between the drive disks 9.1, 9.2 and the flange 24 in the amount of the free angle F, also the second damper stage 4 becomes effective. After this free angle F is reached, the power transmission is additionally performed through the second damper stage 4 onto the output 12 of the damper stage 4, functioning as output component A of the entire device. The particular spring units 19, 22, 36 are configured herein e.g. in the form of so-called compression springs or coil springs. Other embodiments of elastic elements are theoretically also conceivable.

Configuring a torque proof coupling between the drive disks 9.1 and 9.2 of the damper assembly 5 can be performed differently. In the present case, mounting elements 38 are provided, preferably in the form of rivets. These can be disposed radially outside of the radial extension of the spring units 19, 22 of the damper stage 3 and between intermediary flange elements 23.1, 23.2 and the flange 24 as illustrated in FIG. 1*d*. Furthermore, the disposition can be performed outside of the outer diameter of the intermediary flange 23. The torque proof coupling can simultaneously form a stop in circumferential direction, and thus a rotation angle limitation for the intermediary flange 23 or the flange 24.

An additional torque proof coupling of the drive disks for the second damper stage and thus for the damper assembly 7 can be omitted due to the one piece configuration of the input components 8 and 10 of the two damper stages 3, 4.

The embodiments according to FIGS. 1*a* and 1*d* furthermore emphasize a disposition of the particular damper stages 3 and 4 in one axial plane, which is implemented in particular through the configuration of the output component 10 or 12 functioning as an output component A of the device 1 or of the two damper assemblies 5 and 7. As stated supra, said output component is configured in the simplest case as a disk shaped element.

Other embodiments with an offset are also conceivable. In this case, however, at least the flange 24 has to be shaped accordingly, as well as the drive disks 9.1 and 9.2. The embodiment illustrated in FIG. 1, however, depicts a particularly advantageous configuration with respect to the installation space requirements. This applies analogously also for the configuration of the two dampers 6.1 and 6.2 in radial direction and in axial direction relative to one another. These are disposed in radial direction preferably without offset, and on a common diameter $d_3$ and also in a plane in axial direction. Thus, the series-parallel damper assembly can be implemented through a high degree of functional concentration with a minimum installation space.

The protrusions 30 on the outer circumference 29 of the flange 24 furthermore include stop surfaces 39.1, 39.2, which interact with stop surfaces 40.1, 40.2, accordingly configured at the inner circumference 28 of the intermediary flange 23 and oriented in circumferential direction opposite to the stop surfaces 39.1, 39.2. They form a blocking protection for the spring units 19, 22 in the first damper stage 3. The stop surfaces 39.1, 39.2, 40.1, 40.2 are thus configured, so that they only form a rotation angle limitation between the intermediary flange 23 and the flange 24 at a particular predefined spring travel.

In the embodiment illustrated in FIG. 1, when used in a force transmission device in drive trains for vehicles as stated supra, the drive disks 9.1 and 9.2 function as an input component E and the flange 24 functions as an output component A. When the force flow is reversed, the function of the input component E is associated with the flange 24, while the drive disks 9.1, 9.2 then function as an output component A. When such a device is coupled in a drive train in both force flow directions respectively with respect to the input component and the output component with respective driving and driven elements torque is always simultaneously transmitted through this device. When in one functional state, e.g. in push operation there is no coupling with an element forming the input or output component E, A, the device 1 functions as an absorber, this means it compensates vibrations and however does not transfer torque like an elastic clutch.

FIG. 1 illustrates a particularly compact device suitable for applications in force transmission devices for vehicles, including a hydrodynamic component and a lock up device for the hydrodynamic component, which is configured in series to the hydrodynamic component and to the lock up device.

FIG. 2 illustrates the configuration of the intermediary flange 23 and the flange 24 in installed position in a perspective view. The two annular disc shaped elements 23.1 and 23.2 are visible which are disposed offset to one another and the flange 24 extending there between. The particular annular disc shaped element 23.1 and 23.2 does not have to be configured flat when viewed in cross section, but it can be configured with a slight elbow in particular in the enclosed portion of the outer circumference 29 of the flange 24.

The configuration according to the invention according to FIGS. 1 and 2 is characterized by a high degree of functional concentration and simultaneously by a small number of components. Furthermore, it is possible through this configuration to configure a torsion vibration damper with a spring constant which is low as possible which includes a relative rotation angle which is as large as possible and with low friction. This is also implemented in that the series damper assembly is preferably configured on the larger diameter.

| Reference Numerals and Designations | |
|---|---|
| 1 | Vibration Damper |
| 2 | Multi stage series -/parallel damper |
| 3 | First damper stage |
| 4 | Second damper stage |
| 5 | Damper Assembly |
| 6.1, 6.2 | Damper |
| 7 | Damper Assembly |
| 8 | Input Component |
| 9.1, 9.2 | Drive Disc |
| 10 | Output component |
| 11 | Input component |
| 12 | Output component |
| 13 | Input component |
| 14 | Output component |
| 15 | Input component |
| 16 | Output component |
| 17 | Torque Transfer Device |
| 18 | Damping coupling device |
| 19 | Spring Unit |
| 20 | Torque Transfer Device |
| 21 | Damping coupling device |
| 22 | Spring Unit |
| 23 | Intermediary flange |
| 23.1, 23.2 | Annular disc shaped element |
| 24 | Flange |
| 25 | Opening |
| 26 | Stop Surface |
| 27 | Stop surface |
| 28 | Inner Circumference |
| 29 | Outer Circumference |
| 30 | Protrusion |
| 31 | Side Surface |
| 32 | Side Surface |
| 33 | Recess |
| 34 | Torque transmission device |
| 35 | Damping coupling device |
| 36 | Spring Unit |
| 37.1, 37.2 | Stop Surface |
| 38 | Mounting Element |
| 39.1, 39.2 | Stop Surface |
| 40.1, 40.2 | Stop Surface |
| 41 | Opening |
| 42 | Opening |
| 43 | Elastic element |

-continued

| Reference Numerals and Designations | |
|---|---|
| R | Rotation Axis |
| M | Moment |
| α | Relative Rotation Angle |
| F | Free Angle |
| d | Diameter |
| E | Input Component |
| A | Output Component |

What I claim is:

1. A vibration damper (1), including:
a multistage torsion vibration damper (2), comprising at least two coaxially disposed damper assemblies (5, 7), each of them comprising at least one input component (8, 11) and one output component (10, 12) and being disposed on different diameters;
a first damper assembly (5) being disposed on the outside in a radial direction and configured as a series damper, comprising at least two dampers (6.1, 6.2) connected in series and coupled via an intermediate flange (23); and
a second damper assembly (7) being disposed on the inside in the radial direction and including a flange (24) forming the output component (10, 12), the flange (24) including a plurality of radially outwardly extending protrusions (30), wherein:
the intermediate flange (23) comprises at least two annular disk-shaped elements (23.1, 23.2) disposed at a distance in the axial direction and extending on both sides of the flange (24) at least into the portion of the outer circumference (29) of the output component (11) of the first damper assembly (5, 7), each annular disk-shaped element (23.1, 23.2) comprising respective openings (25) extending in the circumferential direction, wholly enclosed by said each annular disk-shaped element (23.1, 23.2), and at least partially defined by respective radial outward portions of said each annular disk-shaped element (23.1, 23.2); and,
the plurality of radially outwardly extending protrusions (30) are wholly axially aligned with the respective openings (25) radially inward of the respective radial outward portions of said each annular disk-shaped element (23.1, 23.2).

2. A device (1) according to claim 1, wherein the annular disc shaped elements (23.1, 23.2) are supported floating.

3. A device (1) according to claim 1, wherein the device is configured as a series-parallel damper (2), wherein the damper assemblies (5, 7) are connected in parallel and the second damper assembly (7) is at least partially rotatable with respect to the first damper assembly (5).

4. A device (1) according to claim 3, wherein the input and the output components (8, 11, 10, 12) of the particular damper assemblies (5, 7) are configured in one layer or in multiple layers which are coupled with one another through spring units (19) and (22) which are rotatable relative to one another in circumferential direction.

5. A device (1) according to claim 3, wherein a rotation clearance of the second damper assembly (7) is characterized by a predefined relative rotation angle defining a free angle (F) between the input component (11) and the output component (12) of the second damper assembly (7), and the relative rotation angle is integrated in the output component (12).

6. A device (1) according to claim 3, wherein the input component (8, 11) of the first and of the second damper assembly (5, 7) is formed by two disc elements (9.1, 9.2) offset from one another in axial direction and the flange (24)

is disposed between the disc elements (9.1, 9.2), wherein the annular disc shaped elements (23.1, 23.2) are disposed in axial direction between the disc elements (9.1, 9.2).

7. A device (1) according to claim 3, wherein the output component (10, 12) of the first and second damper assembly (5, 7) is formed by two disc elements (9.1, 9.2) offset from one another in axial direction and the input component (8, 11) is formed by the flange (24) disposed between the disc elements (9.1, 9.2), wherein the annular disc shaped elements (23.1, 23.2) are disposed in axial direction between the disc elements (9.1, 9.2).

8. A device (1) according to claim 1, wherein the protrusions (30) are disposed at an outer circumference (29) in circumferential direction in equal distances which protrusions form stop surfaces in circumferential direction for spring units (19, 22) and wherein the flange (24) includes recesses (33) in which the spring units (36) of the second damper assembly (7) can be supported.

9. A device (1) according to claim 1, further comprising at least one elastic element (43) which presses the elements apart and is disposed between the two annular disc shaped elements (23.1, 23.2) of the intermediary flange (23).

10. A device (1) according to claim 1, wherein the two dampers (6.1, 6.2), which are connected in series, of the first damper assembly (5) are configured in circumferential direction on a common diameter.

11. A device (1) according to claim 1, wherein the first damper assembly (5) and the second damper assembly (7) are disposed in an axial plane.

\* \* \* \* \*